Sept. 20, 1971      A. WURSTER ET AL      3,605,187
EXTRUDER STRUCTURES
Filed Feb. 13, 1969      2 Sheets-Sheet 2
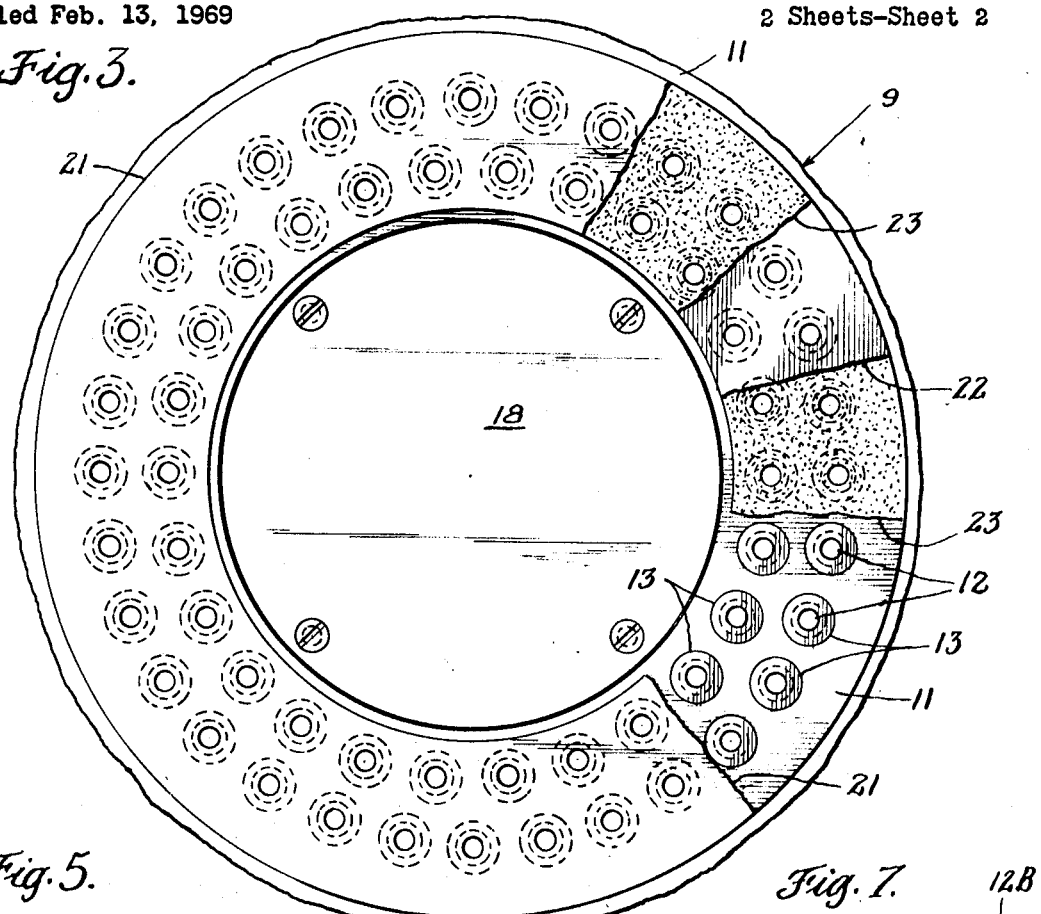
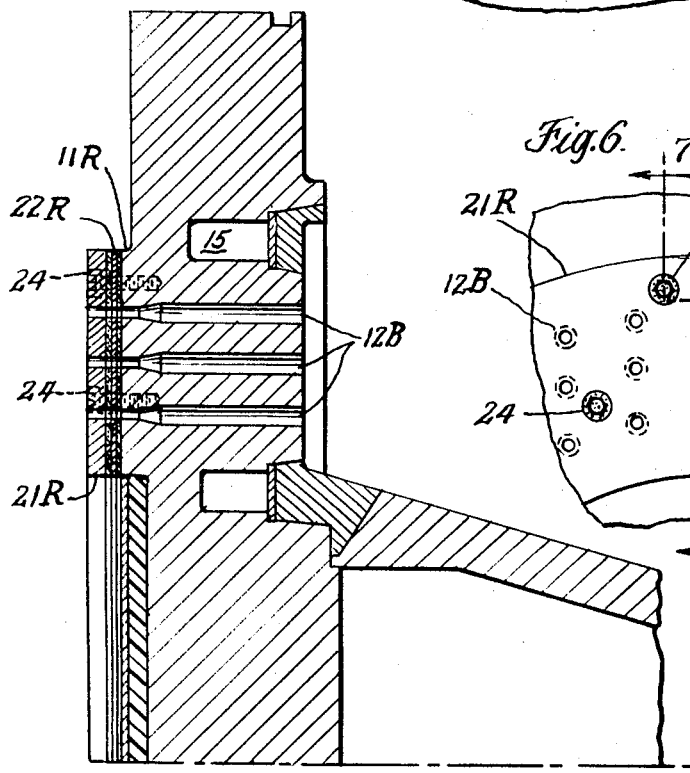
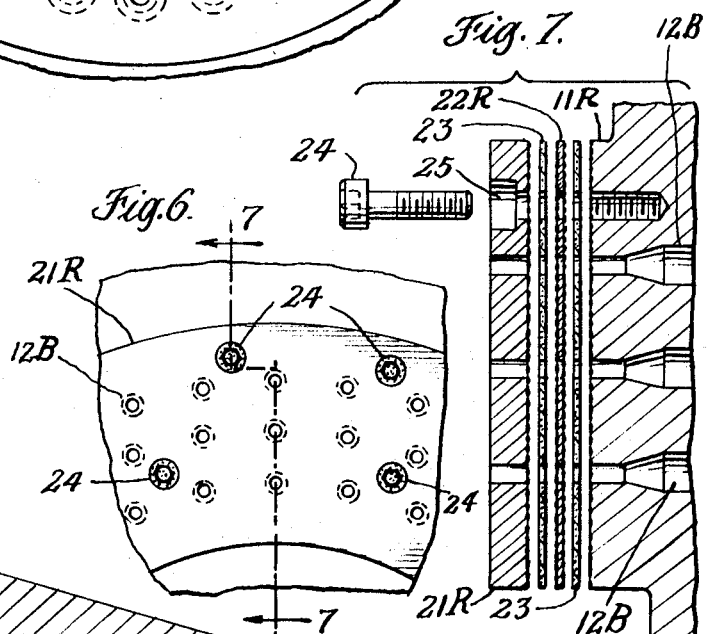
INVENTORS
ALFRED WURSTER AND
ROBERT C. TANNER
BY
ATTORNEYS

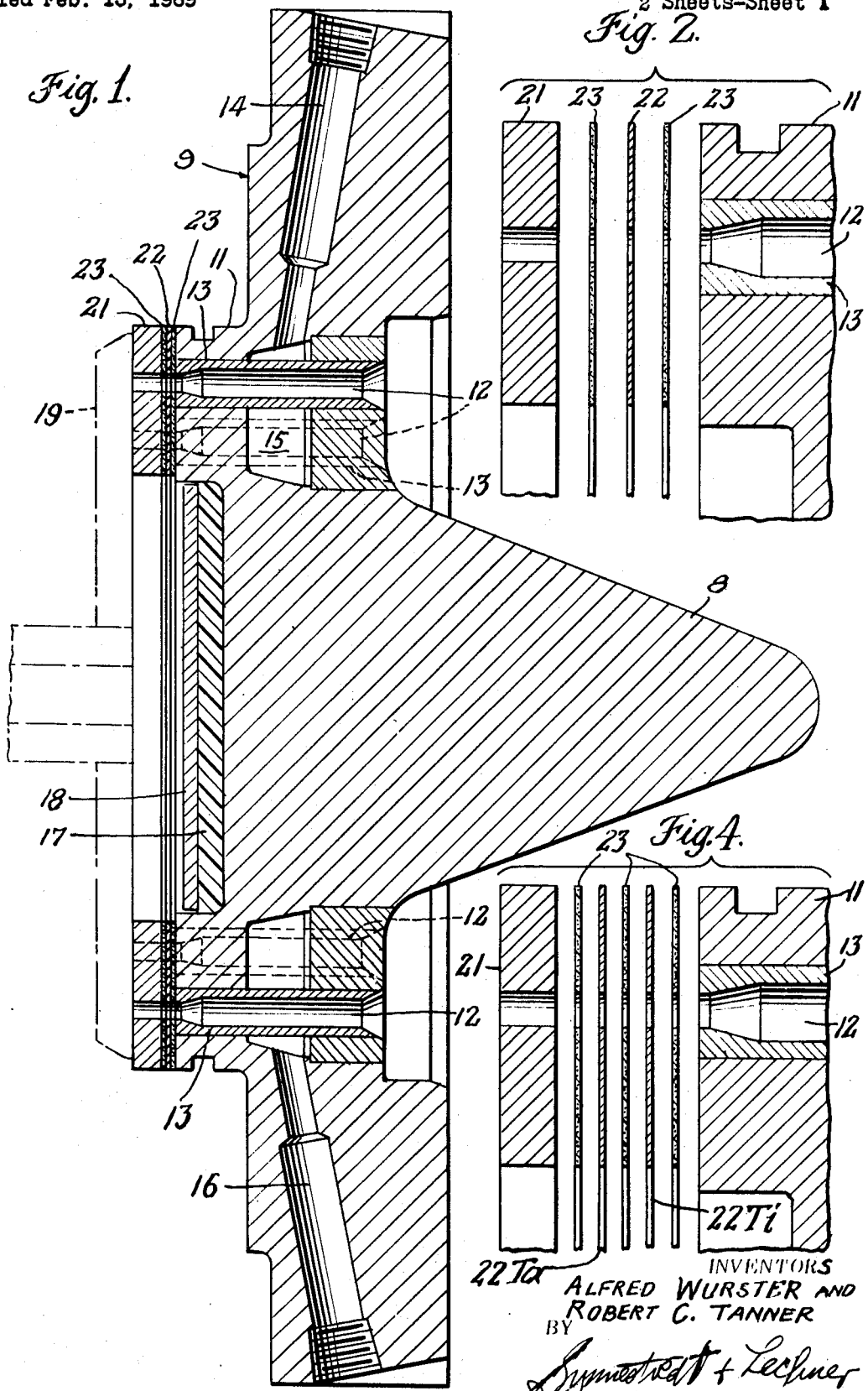

3,605,187
EXTRUDER STRUCTURES

Alfred Wurster, Warrington, and Robert C. Tanner, Southampton, Pa., assignors to Andale Company, Lansdale, Pa.
Filed Feb. 13, 1969, Ser. No. 798,894
Int. Cl. B29f *3/04;* B23k *31/02*
U.S. Cl. 18—12A                                   20 Claims

ABSTRACT OF THE DISCLOSURE

A metallic sandwich, or multiple plate assembly, is provided, for applications where structural strength is required and at the same time an exposed surface must be highly resistive to abrasive wear, a typical application being an extruder head for the extrusion of plastics. For such an extruder structure, having discharge openings at the exit face, which face is adapted to cooperate with a moving cut-off blade, and for other suitable applications, the invention provides an assembly comprising a series of at least three plate means, one of which is a pressure plate and another of which is a wear plate, between which one or more accommodation plates are located, the plates being secured together in series relationship and being respectively made of materials having successively progressing different coefficients of thermal expansion, at least under certain critical temperature conditions; and the plates are typically secured together by brazing material at the interfaces, the said progressing different coefficients of thermal expansion being characteristic of said plates at least at a temperature in the neighborhood of the freezing temperature range of the brazing material. The disclosure is inclusive, inter alia, of pressure plate means of stainless steel, wear plate means of tungsten carbide, and accommodation plate means variously embodying titanium, tantalum, iron, nickel, cobalt and chromium, some separately and some as alloys. To assure a firm brazed bonding of the several plate means, in typical embodiments of the invention the interfaces are given a rough finish. Supplemental securing means such as threaded devices may also be embedded in the assembly.

---

This invention relates to extruder structures or the like, and more particularly to extruder heads such, for example, as are used in apparatus for extruding plastics.

Typically, the invention is applicable in the field of extruder apparatus for the production of plastic pellets, an example of such apparatus being disclosed in the prior U.S. patent application of Daniel R. McNeal, Jr., Ser. No. 590,741, filed Oct. 31, 1966, now Pat. No. 3,452,394.

In the field of such apparatus, it is customary to extrude the plastic material through an extruder head, under considerable pressure (variously of the order of some hundreds of lbs. per square inch, for certain plastics, and thousands of pounds per square inch for other plastics) and under temperature conditions ranging up to 500° F. or higher at the upstream face of the extrusion head and down to much lower figures at the downstream or exit face. These conditions, coupled with the severe wear problems encountered in installations where a rapidly moving blade is associated with the exit face of the head for cutting off pellets as the plastic passes out of the extrusion passages, require a very robust construction and an exceptionally hard and durable wear surface at the exit face, as is brought out quite fully in said McNeal application. In known extruder head constructions, typified by those disclosed in said McNeal application, hard wear surfacing is provided by a multiplicity of tiles applied to the exit face of the head, these being typically of tungsten carbide, the stresses between the surfacing and the body of the head being largely relieved by virtue of the subdivision of the surfacing into numerous tile-like pieces.

Although such construction is operationally satisfactory, it will be apparent that with large extruder heads, having many hundreds of extrusion passages, the aligning of hundreds of apertured tiles with the passages, during manufacture, involves considerable work.

It would, accordingly, be advantageous to apply the hard surfacing as a complete disc or ring, or in the form of a few large segments, but heretofore it has been difficult, if not impossible, to apply an extremely hard wear surface member (e.g., tungsten carbide) of adequate thickness and of large surface area to the typical head member (e.g. stainless steel), in a way to maintain the integrity of the structure. Efforts along that line have been characterized by cracking, splitting, chipping, or even dislodgment, of the hard surface material.

The production of very large heads, for example having extrusion areas of 15, 20 or 25 inches diameter, or more with a unitary hard surface member, or even with such a member applied in the form of a few large segments, with any assurance of continued integrity of the surface, has appeared to present insuperable obstacles; although it has been recognized that such a structure, if practicable, would be highly desirable, especially from the standpoint of simplicity and reduction of manufacturing costs; also from the standpoint of smoother cooperation with the cut-off-blade, and more uniform wear of the parts and hence a better pellet product.

The difficulties appear to be related to the contrasting natures of the typical steel extruder head structure, and the hard tungsten carbide (or equivalent) surfacing. The former is of relatively high tensile and shear strength, while the latter is of relatively low tensile and shear strength. The former has a relatively high coefficient of thermal expansion, while the latter has a relatively low coefficient. When brazed together, the resultant structure has been characterized by intolerable stresses in the hard surface part of the assembly.

The principal object of the present invention is to overcome the above problems and disadvantages of the prior art. In attaining this object, the invention contemplates an accommodation between the differences in characteristics of the pressure plate and the wear plate in an extruder or the like; and more particularly it contemplates the structure of, and method of producing, a brazed assembly for that purpose, comprising a pressure plate and a wear plate of substantially different coefficients of thermal expansion, and between said plates one or more accommodation plates having thermal expansion characteristics of intermediate nature.

Further, the invention contemplates applying a hard wear plate of relatively low coefficient of thermal expansion, e.g. tungsten carbide, in the form of several large segments or even as a unitary disc or ring, to an extruder head member (which may conveniently be termed a pressure plate) of relatively high coefficient of thermal expansion, e.g. type 410 or type 17–4–pH stainless steel, through the intermediation of one or more cushioning layers, preferably a thin sheet (which may conveniently be termed an accommodation plate) of one or more metals or alloys having thermal expansion characteristics in between those of the wear plate and the pressure plate, e.g. tantalum and/or titanium, or a suitable alloy (for example) of iron, nickel and cobalt, or alternatively (for example) of iron, nickel, chromium and titanium; together with intermediate brazing material at all the interfaces of said plates, e.g. a suitable silver type brazing material, desirably in association with a flux.

More specifically, the invention contemplates such novel structures assembled by techniques which include the application of a compressive force on the assembly during the brazing, and preferably the application thereof by screw means embodied in the assembly, as set forth and claimed in our divisional application on said techniques.

Our divisional application, containing claims on the techniques referred to was filed on Jan. 13, 1971, and is identified by Ser. No. 106,105.

Still further the invention contemplates roughening of the interface surfaces of the plate members, preferably also in conjunction with the use of screw means (as aforesaid), whereby the brazing is more thorough, more extensive, and freer from void spaces and/or pockets of gases or flux material, so that the assembly can withstand very great stresses in service, over a long period of time.

How the foregoing objects and advantages, and others which will occur to persons skilled in this art, are attained by this invention will appear more fully from the following description and from the drawings.

FIG. 1 is a cross-sectional view of a tube-type of heated extruder head, of a general construction somewhat similar to the type shown in FIG. 1 of the McNeal Pat. 3,452,394, illustrating an accommodation plate of the characteristics contemplated by the present invention disposed between the pressure plate and the wear plate; this figure also showing in dot-and-dash lines the rotating pellet-cutoff blade which cooperates with the exit face of the assembly when the plastic material is being extruded through the passages.

FIG. 2 is a fragmentary, exploded, sectional view of parts shown in FIG. 1 but to a larger scale, illustrating, from right to left, the pressure plate (with an extrusion tube shown), a layer or sheet of brazing material, in accommodation plate, a layer of brazing material, and the wear plate.

FIG. 3 is a fragmentary face view of the extruder head of FIG. 1 as seen from the left of FIG. 1, with portions broken away to show the several parts of the assembly.

FIG. 4 is an exploded view similar to FIG. 2 but of an embodiment which includes two accommodation plates and three layers of brazing material.

FIG. 5 is an one-half cross-section of a second type of heated extruder head, wherein the extrusion passages are bored directly through the pressure plate (instead of being formed as tubular inserts), and illustrating the application to such a head of a third embodiment of the invention, wherein the interfaces of the plates are roughened and the assembly is gripped together under the influence of capscrews whose heads are recessed into the wear plate.

FIG. 6 is a fragmentary face view of the extruder head of FIG. 5 as seen from the left of FIG. 5.

FIG. 7 is an exploded sectional view taken on the line 7—7 of FIG. 6, but to a larger scale.

Referring first to FIGS. 1 to 3, a typical extruder head comprises a central conical structure 8 and a peripheral heavy plate structure 9 which is conveniently termed the pressure plate. In the annular area 11 of the latter there are a plurality of extrusion passages 12, which, in this embodiment, are formed by tubes 13 (of a nature fully set forth in said McNeal application). In general, the head is heated by a fluid passage system 14, 15, 16, and heat losses are minimized by the insulation assembly 17, 18. The pellet-cut-off blade 19 rotates rapidly over the exit face of the assembly now to be described.

A hard wear plate 21, preferably of tungsten carbide (typically .25 inch thick), is secured to the pressure plate 11, for example of type 410 stainless steel, through the intermediation of the cushion plate 22 (typically .03, or even as thin as .01, of an inch) and the two layers of brazing material 23, 23 (typically each about .015 inch in thickness, but preferably thicker than the cushion plate).

By way of example, but not by way of limitation (except where limitations involve essential or significant distinctions from the prior art), the pressure plate 11 may be of a stainless steel, having a coefficient of thermal expansion of about 6.1 to 7.4×10$^{-6}$ in./in./° F. at temperatures variously in the range of 400° F. to 1200° F. (400° being in the neighborhood of a typical operating temperature for the head, and 1200° being in the neighborhood of a typical brazing temperature). Thus, a type 410 S.S. head may involve a figure of about 6.5 at about 1200° and a type 17–4–pH will involve a higher figure say about 7.4 at about 1200° F.

Again by way of example the wear plate 21 may be of tungsten carbide (titanium carbide or tantalum carbide may be used as alternatives, with suitable adjustments as to brazing techniques) having a coefficient (on a basis similar to that given above for S.S.) of about 2.9 to 3.9.

The substantial difference in thermal coefficients of members 11 and 21 would normally give rise to substantial stresses at the brazed junction thereof and cause severe damage to the rather frangible member 21, but by this invention there is a compensation, cushioning, yielding, or accommodation between them by means of one or more intermediate plates, having intermediate thermal characteristics.

By way of example, the intermediate plate means may comprise an accommodation plate 22 of titanium, having a coefficient (on a basis similar to that given above, through the temperature range here considered) of about 5 to 5.6.

As another example, a tantalum plate 22, with a coefficient of about 3.57 to 4.3, may be employed. In either case, layers of brazing material 23 are interposed between the plates. This material is preferably in the form of thin sheets (say .015" each); and the composition (as is known in the brazing art) will be suited to the materials of the plates to be brazed, and to the temperatures to be employed, and whether the brazing is done over a relatively prolonged period (as in a furnace process) or more quickly (as by induction, torch or resistance processes). An induction or a torch process is best suited to the brazing of titanium and tantalum.

In preparing the assembly, the required multiplicity of apertures, to be aligned with the extrusion passages, may be made before assembling (as by jigs, etc.) or afterwards; but it should be noted that in view of the hardness of plate 21 the holes therein are preferably made by an "Elox" tool or the like. When ready for the brazing, the assembly is subjected to a compressive force, for example by placing the assembly horizontally and putting a substantial weight thereon.

Since the coefficient of the titanium plate is closer to that of the pressure plate than to that of the wear plate, and the coefficient of the tantalum plate is closer to that of the wear plate than to that of the pressure plate, an improved result is obtainable by utilizing a plate of each, designated 22 Ti and 22 Ta in the alternative embodiment of FIG. 4; and in this case three sheets 23 of braze material are used, as shown.

For best results, the intermediate accommodation should be made by a plate of material having a thermal coefficient close to the midway point between the coefficients of the pressure plate and the wear plate; and still further it has been found that this condition should exist under temperature conditions approximating the brazing temperature. The choice of braze alloy may thus influence the choice of material for the accommodation plate.

A good braze alloy is one comprising Ag, Cu, Zn, Cd and Ni. As one example, the alloy sold under the trademark "Easy Flo 3" has a melting point of about 1170° F. and a flow point of about 1270° F. When the brazed joint is cooled, the alloy thus freezes at close to 1170° F. and the chief stresses between the pressure plate and the wear plate will occur at that time. Accordingly, it is especially advantageous to utilize for the accommodation plate a material which at that temperature has a thermal coefficient substantially midway between the coefficients of the pressure plate and the wear plate at that same temperature.

This desirable condition is obtained by the use (with a stainless steel pressure plate and a tungsten carbide wear plate) of an intermediate plate of an alloy of iron, nickel and cobalt, in about the proportions: Fe 54%, Ni 29%, Co 17%. While this alloy has a thermal coefficient curve which drops from about 2.8 at 400° F. to about 2.65 at 750° F., it rises with further increase in temperature, and reaches a value of about 4.75 at about 1200° F. This is close to the mid-point between the value of 6.5 for the type 410 S.S. plate and the value of 3.6 for a typical tungsten carbide plate, at 1200° F. Accordingly such an alloy has particular advantages in the practice of the present invention, and it may well be used for the plate 22 in the form of FIGS. 1 to 3. It is also well suited to furnace brazing.

In the form of FIGS. 5 to 7, the extruder head has its passages directly bored as shown at 12B. The plates are designated 11R, 21R and 22R. These may best be made, respectively, of 410 S.S., tungsten carbide and iron-nickel-cobalt alloy, as last above described, but, in addition, their interface surfaces are roughened, as indicated by the dotted areas shown best in FIG. 7. This may be done, for example, by machining the plate 11R, grinding the plate 21R and sanding the plate 22R. From having a normal surface finish of about 30 to 60 microinches, these surfaces may be sanded, ground or otherwise roughened to a finish of about 125 to 250 microinches. A much improved brazing bond is thus secured. Further substantial improvement is secured by employing the socket-head cap-screws 24 whose heads are received in the recesses 25 in the wear plate. When the assembly is prepared for brazing, the screws are tightened to impose a compressive force, so that when the brazing is done there is a minimum of distortion of the assembly and a minimum of entrapment of gases or of brazing flux such as might weaken the brazing bond.

As a further alternative for the accommodation plate, an alloy may be used comprising iron, nickel, chromium and titanium, in the proportions of about: Fe 48.5%, Ni 42%, Cr, 5.4%, Ti 2.4%, and the balance made up of other materials or impurities. Such an alloy has a thermal coefficient intermediate the coefficients of the pressure plate and the wear plate, though perhaps not so close to the midpoint as that which characterizes the iron-nickel-cobalt, previously discussed.

The brazing alloy hereinbefore suggested has particular advantages, not only for the temperature of its melting point. It is also of advantage because of its nickel content. This acts as a wetting agent, and aids the molten silver solder in alloying with the tungsten carbide.

In the practice of this invention, it is desirable to keep at a minimum the oxides which tend to form on the surfaces being joined. These should be cleaned off to the greatest extent possible, as by mechanical, chemical and hydrogen cleaning. Otherwise, the brazing alloys will not "wet" or flow adequately on the surfaces. It is desirable to use a fluxing medium with the brazing material, as fluxing helps to prevent oxide from forming, and also tends to dissolve and absorb oxides that do form. To be most effective, the flux should be most active and should flow freely in a temperature range well below the flow point of the brazing alloy. A typical suitable flux material is that sold under the trademark "Handy Flux" type "B–1", which promotes the wetting action on the tungsten carbide and on the stainless steel. It is effective in a temperature range from 1100° F. up to as high as 1700° F.

As to both the accommodation layer and the brazing layers, the preferred materials herein disclosed are of a nature such as to provide a good cushioning effect. The accommodation layer should be malleable enough to deform somewhat under the brazing strain without loosening the bond to the stainless steel or the tungsten carbide. The brazing layer should be quite ductile and this ductility is increased by maintaining the silver content at a minimum. Together, the accommodation plate and the brazing layers form a combined cushion between the pressure plate and the wear plate.

The brazing material hereinabove suggested as a preferable material, has the characteristic of being rather sluggish, even at temperatures above its flow point. This alloy will start to melt at one temperature, and melting is not complete until a substantially higher temperature is reached. Thus, it will fill larger gaps than will the more fluid brazing alloys. This is of value, in the furnace, since the stainless steel plate will bow to a certain extent when at the high end of the temperature range in the furnace, thus forming gaps between the layers of the assembly, which tend to be filled by a sluggish type of silver solder.

It is generally desirable, after completion of the assembly, to grind off and polish the face thereof, so as to remove any protruding braze or other excess material and to square off the face so it will present a smooth surface to the rotating blade 19.

While the drawings illustrate only constructions wherein a complete annular wear plate is applied, it will be understood that segmental arrangements, and even individual tiles (one for each aperture), may be applied in accordance with this invention, although the advantages are most fully secured in connection with the application of an integral wear plate to a large extrusion head.

The disclosure is intended as illustrative of the preferred embodiments of the invention, and not to be limited except by the claims, as given the broadest construction consistent with differentiation from the prior art.

We claim:

1. For an extruder or the like, an assembly comprising a pressure plate and a wear plate having substantially different coefficients of thermal expansion, between said plates an accommodation plate having a coefficient of thermal expansion which lies between those of said first two plates, and brazing material at the respectively adjacent faces of said plates securing them together.

2. For an extruder or the like, an assembly comprising a series of plates, including a pressure plate, a wear plate, and between them a plurality of accommodation plates, the plates of the series having different coefficients of thermal expansion which successively progress from one end of the series to the other, and brazing material at the respectively adjacent faces of said plates securing them together.

3. For an extruder or the like, an assembly comprising a pressure plate having a relatively high coefficient of thermal expansion, a wear plate having a relatively low coefficient of thermal expansion, an intermediate plate having a coefficient of thermal expansion which lies between the said two coefficients, and brazing material at the respectively adjacent faces of said plates securing them together.

4. For an extruder or the like, an assembly comprising a pressure plate having a relatively high coefficient of thermal expansion, a plurality of accommodation plates having progressively lower coefficients of thermal expansion, and a wear plate having a still lower coefficient of thermal expansion, and brazing material at the respectively adjacent faces of said plates securing them together.

5. An assembly according to claim 1, wherein the specified relationship of the respective coefficients of thermal expansion exists at the normal freezing temperature range of the brazing material.

6. An assembly according to claim 2 wherein the specified relationship of the respective coefficients of thermal expansion exists at the normal freezing temperature range of the brazing material.

7. An assembly according to claim 3 wherein the specified relationship of the respective coefficients of thermal expansion exists at the normal freezing temperature range of the brazing material.

8. An assembly according to claim 4 wherein the specified relationship of the respective coefficients of thermal expansion exists at the normal freezing temperature range of the brazing material.

9. For an extruder or the like, an assembly comprising, in series, pressure plate means, accommodation plate means, and wear plate means, and brazing material at the respectively adjacent faces of the various plates which constitute said means and securing them together, all plates in the series having successively progressing different coefficients of thermal expansion at least at a temperature in the neighborhood of the freezing temperature range of the brazing material.

10. The assembly of claim 9 wherein the accommodation plate means comprises a plurality of plates.

11. The assembly of claim 10 wherein said plates include one of titanium and one of tantalum.

12. The assembly of claim 9 wherein the accommodation plate means comprises a plate containing iron, nickel and cobalt.

13. The assembly of claim 12 wherein the content of iron is in the neighborhood of 54%, of nickel is in the neighborhood of 29% and of cobalt is in the neighborhood of 17%.

14. The assembly of claim 9 wherein the accommodation plate means comprises a plate containing iron, nickel, chromium and titanium.

15. The assembly of claim 9 wherein the surfaces of said plates subjected to the brazing material are roughened.

16. The assembly of claim 9 having supplemental securing means such as threaded devices embedded therein.

17. The assembly of claim 9 wherein the brazing material has a melting temperature in the neighborhood of 1170° F.

18. The assembly of claim 9 wherein the pressure plate means comprises an extruder member of stainless steel, the wear plate means comprises an apertured plate of tungsten carbide and the accommodation plate means comprises an alloy sheet containing iron, nickel, and cobalt.

19. The assembly of claim 9 wherein the accommodation plate means comprises one or more plates of a thickness less than the thickness of the wear plate means.

20. The assembly of claim 19 wherein the layers of brazing material are each thicker than any accommodation plate of the assembly.

References Cited

UNITED STATES PATENTS

| | | |
|---|---|---|
| 2,462,002 | 2/1949 | Read. |
| 2,488,129 | 11/1949 | La Lande. |
| 2,693,725 | 11/1954 | Cummins ＿＿＿＿＿＿＿＿ 29—504X |

J. SPENCER OVERHOLSER, Primary Examiner

L. R. FRYE, Assistant Examiner

US. Cl. X.R.

29—502, 504; 264—142